(No Model.)

G. F. DEUNERLÖHR.
ERASER.

No. 436,891. Patented Sept. 23, 1890.

Witnesses:
Wm. Wagner
Wm. H. Lowe

Inventor:
G. F. Dennerlöhr
by his attorneys
Roeder & Briesen

UNITED STATES PATENT OFFICE.

GEORG FRIEDRICH DEUNERLÖHR, OF MINDELHEIM, GERMANY.

ERASER.

SPECIFICATION forming part of Letters Patent No. 436,891, dated September 23, 1890.

Application filed June 11, 1890. Serial No. 355,025. (No model.)

*To all whom it may concern:*

Be it known that I, GEORG FRIEDRICH DEUNERLÖHR, residing at Mindelheim, Bavaria, German Empire, have invented a new and useful Improvement in Erasers, of which the following is a specification.

This invention relates to an eraser of improved construction; and it consists in the various features of improvement more fully pointed out in the claim.

Figure 1:
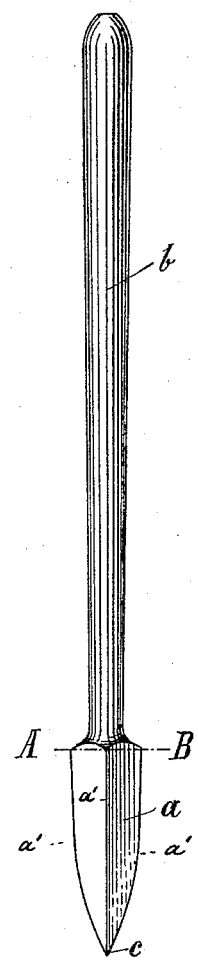
Figure 2:

In the accompanying drawings, Figure 1 is a side elevation of my improved eraser; Fig. 2, a cross-section on line A B, Fig. 1.

The letter $a$ represents the steel blade of the eraser, which is made of prismatic or triangular form in cross-section, as shown. The three cutting-edges $a'$ of the blade curve inward toward the end of the blade and form the point $c$. The blade $a$ is provided with a handle $b$, as usual. The point and cutting-edges of the blade are made of glass-hard steel, so that the eraser retains its sharpness for a long time. In erasers that require frequent grinding soft spots are apt to be exposed that render the eraser useless. Moreover, in my eraser its shape excludes its illegitimate use for cutting pencils or paper; but the shape of my eraser renders it highly convenient for its legitimate use. After an erasure has been made by the cutting-edges $a'$, the paper may be smoothed over by the flat faces of the blade between such cutting-edges.

What I claim is—

An eraser composed of a handle and a prismatic steel blade having curved cutting-edges that meet at a point, substantially as specified.

In testimony whereof I have signed this specification in the presence of two subscribing witnesses.

GEORG FRIEDRICH DEUNERLÖHR.

Witnesses:
EMIL HENZEL,
EDW. W. MEALEY.